(12) United States Patent
Maruyama et al.

(10) Patent No.: US 11,295,130 B2
(45) Date of Patent: Apr. 5, 2022

(54) AERIAL LINE EXTRACTION SYSTEM AND AERIAL LINE EXTRACTION METHOD

(71) Applicant: HITACHI SOLUTIONS, LTD., Tokyo (JP)

(72) Inventors: Kishiko Maruyama, Tokyo (JP); Nobutaka Kimura, Tokyo (JP); Sadaki Nakano, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/036,674

(22) Filed: Sep. 29, 2020

(65) Prior Publication Data
US 2021/0103727 A1    Apr. 8, 2021

(30) Foreign Application Priority Data
Oct. 7, 2019    (JP) .............................. JP2019-184232

(51) Int. Cl.
| | | |
|---|---|---|
| G06K 9/00 | (2006.01) | |
| G06K 9/40 | (2006.01) | |
| G06K 9/32 | (2006.01) | |
| G06K 9/62 | (2006.01) | |

(52) U.S. Cl.
CPC ....... *G06K 9/00637* (2013.01); *G06K 9/3233* (2013.01); *G06K 9/40* (2013.01); *G06K 9/6218* (2013.01)

(58) Field of Classification Search
None
See application file for complete search history.

(56) References Cited

U.S. PATENT DOCUMENTS

2020/0097618 A1*  3/2020  Agouridis ............... G06F 30/13

FOREIGN PATENT DOCUMENTS

| JP | 2013126960 A | * | 6/2013 | ............... G06T 7/60 |
| JP | 2018-195240 A | | 12/2018 | |

OTHER PUBLICATIONS

Jwa, Y., G. Sohn, and H. B. Kim. "Automatic 3d powerline reconstruction using airborne lidar data." Int. Arch. Photogramm. Remote Sens 38.Part 3 (2009): W8. (Year: 2009).*

Zhu, Lingli, and Juha Hyyppä. "Fully-automated power line extraction from airborne laser scanning point clouds in forest areas." Remote Sensing 6.11 (2014): 11267-11282. (Year: 2014).*

Clode, Simon, and Franz Rottensteiner. "Classification of trees and powerlines from medium resolution airborne laserscanner data in urban environments." Proceedings of the APRS Workshop on Digital Image Computing (WDIC), Brisbane, Australia. vol. 21. 2005. (Year: 2005).*

* cited by examiner

*Primary Examiner* — David Perlman
(74) *Attorney, Agent, or Firm* — Volpe Koenig (57) ABSTRACT

Provided is an aerial line extraction system including: an area-of-interest cropping unit that crops a region where a point cloud data of aerial lines is assumed to exist as an area of interest by setting coordinates of utility poles as a reference from a three-dimensional point cloud data of a three-dimensional shape that includes the aerial lines and trees installed in the air via the utility poles; an aerial line candidate extraction unit that extracts a candidate point cloud data of the aerial lines from the three-dimensional point cloud data in the area of interest; and an aerial line model estimation unit that estimates a model of the aerial lines on the basis of the extracted candidate point cloud data of the aerial lines.

12 Claims, 11 Drawing Sheets

AERIAL LINE EXTRACTION SYSTEM AND AERIAL LINE EXTRACTION METHOD

BACKGROUND OF THE INVENTION

1. Field of the Invention

The present invention relates to an aerial line extraction system and an aerial line extracting method.

2. Description of the Related Art

There is known a mobile mapping system (MMS) in which an inspection vehicle is equipped with measuring devices such as a three-dimensional laser scanner (laser distance measuring device), a digital camera, and a GPS, and while traveling, the inspection vehicle collects a three-dimensional shape of a terrain and structures around a road in a form of three-dimensional point cloud data.

The MMS can efficiently and accurately acquire a wide range of three-dimensional point cloud data around the road, and thus, the MMS has been expected to be used for checking the situations of facilities such as utility poles and aerial lines (electric lines and communication lines) around the road.

For example, in JP 2018-195240 A, three-dimensional model data of facilities is generated on the basis of three-dimensional point cloud data acquired by the MMS, and the thickness, inclination angle, and deflection of the utility pole (pole) and the tree and the minimum ground height of the aerial line (cable) are calculated on the basis of this three-dimensional model data. In addition, the three-dimensional model data are superimposed on the image data imaged by the digital camera so as to match the respective position coordinates, and the parameter information indicating the structures of the utility poles, the trees and the aerial lines is indicated on the three-dimensional superimposed image.

JP 2018-195240 A discloses a method of generating three-dimensional model data of utility poles, trees, and aerial lines on the basis of three-dimensional point cloud data and superimposing the three-dimensional model data and image data to visualize the data for the purpose of detecting outdoor facilities such as utility poles and aerial lines.

In JP 2018-195240 A, a utility pole and a tree are modeled as a three-dimensional object in which circles are vertically overlapped, and an aerial line is modeled as a three-dimensional object in which catenary curves are connected. In a process of detecting the aerial line, noise removal is performed by removing unnatural catenary curves. However, in a case where trees become noise in mountainous areas, a large number of catenary curves become candidates for the aerial lines, it is difficult to remove the noise.

SUMMARY OF THE INVENTION

An object of the present invention is to enable extraction of aerial lines even in a case where trees become noise by separating aerial lines and noises such as trees from three-dimensional point cloud data in an aerial line extraction system, and after that, performing model estimation.

According to an aspect of the present invention, there is provided an aerial line extraction system including: an area-of-interest cropping unit that crops a region where a point cloud data of aerial lines is assumed to exist as an area of interest by setting coordinates of utility poles as a reference from a three-dimensional point cloud data of a three-dimensional shape that includes the aerial lines and trees installed in the air via the utility poles; an aerial line candidate extraction unit that extracts a candidate point cloud data of the aerial lines from the three-dimensional point cloud data in the area of interest; and an aerial line model estimation unit that estimates a model of the aerial lines on the basis of the extracted candidate point cloud data of the aerial lines, in which the aerial line candidate extraction unit segments the three-dimensional point cloud data in the area of interest by slice planes at regular intervals, generates a plurality of clusters by clustering regions segmented by the slice planes, and extracts the candidate point cloud data of the aerial lines by classifying the plurality of clusters by a predetermined size.

According to another aspect of the present invention, there is provided an aerial line extraction system, including: an area-of-interest cropping unit that crops a region where a point cloud data of an aerial line is assumed to exist as an area of interest by setting coordinates of a utility pole as a reference from a three-dimensional point cloud data of a three-dimensional shape that includes the aerial line and the tree installed in the air via a utility pole; an aerial line candidate extraction unit that extracts a candidate point cloud data of the aerial line from the three-dimensional point cloud data in the area of interest; and an aerial line model estimation unit that estimates a model of the aerial line on the basis of the extracted candidate point cloud data of the aerial line, in which the aerial line candidate extraction unit extracts the candidate point cloud data of the aerial line by removing the point cloud data of the tree as noise from the three-dimensional point cloud data in the area of interest.

According to still another aspect of the present invention, there is provided an aerial line extracting method including: a three-dimensional point cloud data acquiring step of acquiring a three-dimensional point cloud data of a three-dimensional shape including aerial lines and trees installed in the air via utility poles; an area-of-interest cropping step of cropping a region where a point cloud data of the aerial lines is assumed to exist as an area of interest by setting coordinates of the utility poles as a reference from a three-dimensional point cloud data; an aerial line candidate extracting step of extracting a candidate point cloud data of the aerial lines from the three-dimensional point cloud data in the area of interest; and an aerial line model estimating step of estimating a model of the aerial lines on the basis of the extracted candidate point cloud data of the aerial lines, in which the aerial line candidate extracting step segments the three-dimensional point cloud data in the area of interest by slice planes at regular intervals; generates a plurality of clusters by clustering regions segmented by the slice planes, and extracts the candidate point cloud data of the aerial lines by classifying the plurality of clusters by a predetermined size.

According to one aspect of the present invention, in an aerial line extraction system, by separating aerial lines and noise such as trees from three-dimensional point cloud data, and after that, by performing model estimation, the aerial lines can be extracted even in a case where the trees become noise.

DETAILED DESCRIPTION OF THE PREFERRED EMBODIMENTS

Hereinafter, embodiments will be described with reference to the drawings.

First Embodiment

An example in which a three-dimensional point cloud data is acquired by a laser distance measuring device will be described with reference to FIG. 1. For example, the laser distance measuring device 102 is mounted on a vehicle 101, and the vehicle is allowed to travel while measuring the periphery of the vehicle 101. The laser distance measuring device 102 is a device that scans a laser beam 103 at predetermined intervals and collects three-dimensional point cloud data of the surrounding in a three-dimensional shape. A wide range of a three-dimensional map data can be generated by integrating the three-dimensional point cloud data collected while traveling. Such a technique is known as Mobile Mapping System (MMS).

The three-dimensional point cloud data includes not only data of roads 104, utility poles 105, or buildings such as buildings and signs but also includes data of aerial lines 106 such as electric lines or communication lines installed through the utility poles 105 in the air and trees 107. In addition, although not illustrated in FIG. 1, the aerial line 106 includes a lead-in line from the utility pole 105 to each house, a branch line supporting the utility pole, and the like. Such arrangement information of the aerial lines 106 is useful for the time of performing maintenance of electric lines, communication lines, and the like.

An example of the three-dimensional point cloud data acquired in FIG. 1 will be described with reference to FIG. 2. The three-dimensional point cloud data includes a point group 204 of roads, a point group 205 of utility poles, a point cloud 206 of aerial lines, and a point cloud 207 of trees.

Figure 3:
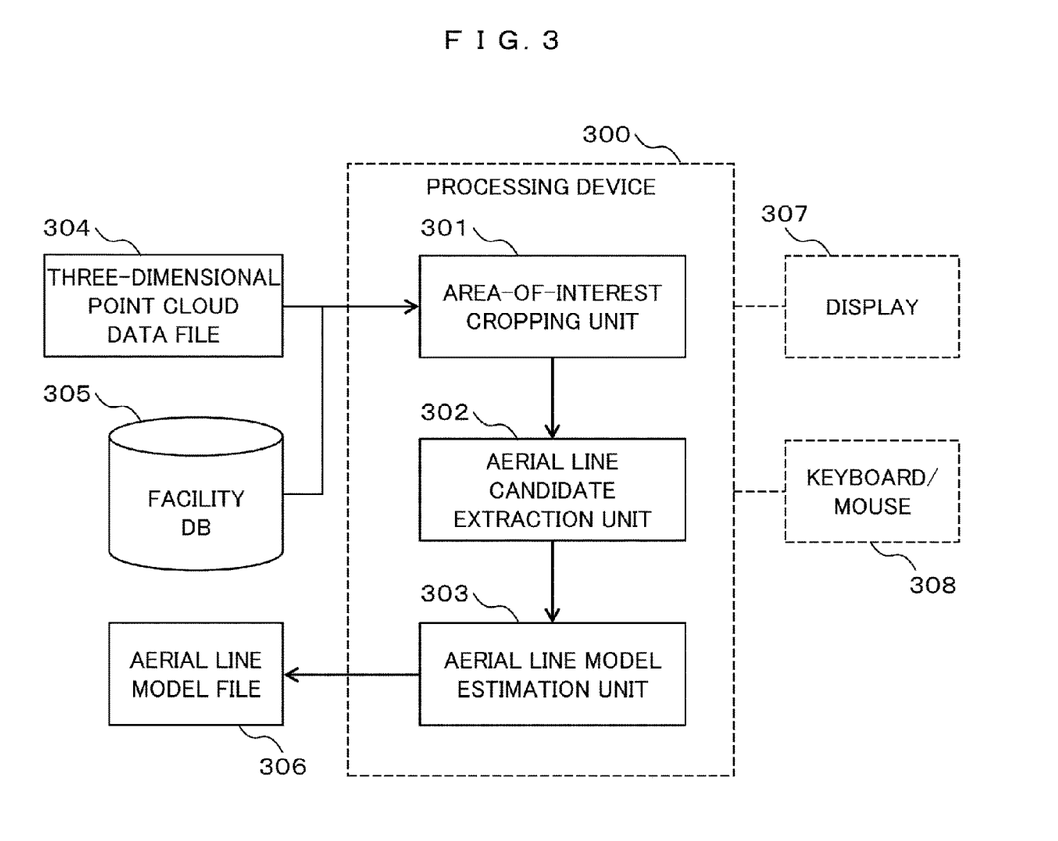
FIG. 3 is a block diagram illustrating a configuration of an aerial line extraction system according to a first embodiment.

The configuration of the aerial line extraction system according to the first embodiment will be described with reference to FIG. 3. The aerial line extraction system according to the first embodiment includes a processing device 300. The processing device 300 includes an area-of-interest cropping unit 301, an aerial line candidate extraction unit 302, and an aerial line model estimation unit 303. In addition, a three-dimensional point cloud data file 304, a facility database (facility DB) 305, an aerial line model file 306, a display 307 as a display device, and a keyboard/mouse 308 as an input device are connected to the processing device 300. Herein, the processing device 300 is configured with, for example, a processor (CPU, GPU, or the like). In addition, the area-of-interest cropping unit 301, the aerial line candidate extraction unit 302, and the aerial line model estimation unit 303 are configured with, for example, a processor (CPU, GPU, or the like).

The three-dimensional point cloud data file 304 stores the three-dimensional point cloud data acquired by the laser distance measuring device 102. As illustrated in FIG. 2, the three-dimensional point cloud data includes a point cloud data 204 of the road 104, a point cloud data 205 of the utility pole 105, a point cloud data 206 of the aerial line 106, and a point cloud data 207 of the tree 107.

The facility DB 305 stores a management data of the utility pole 105 registered in advance. The management data of the utility pole 105 includes information of, for example, a management number, a type (model number, diameter, height), an installation position (address, coordinates), and the like.

The area-of-interest cropping unit 301 sets a region where the point cloud 206 of the aerial line 106 is assumed to exist as an area of interest by setting coordinates of the utility pole 105 stored in the facility DB 305 as a reference from the three-dimensional point cloud data stored in the three-dimensional point cloud data file 304 and extracts a point cloud data in the area of interest.

The aerial line candidate extraction unit 302 removes noise such as the trees 107 from the three-dimensional point cloud data in the area of interest and extracts the point cloud data that is a candidate for the aerial line 106.

The aerial line model estimation unit 303 estimates an aerial line model represented by a catenary curve (or a quadratic curve approximation of the catenary curve) on the basis of the three-dimensional point cloud data that is a candidate for the aerial line 106 and outputs the parameter of the aerial line model to the aerial line model file 306. The model estimation performed by the aerial line model estimation unit 303 is based on a general model estimation method such as Random Sample Consensus (RANSAC).

The display 307 is a display device that displays the three-dimensional point cloud data and the aerial line model and displays, for example, the three-dimensional point cloud data and the aerial line model as illustrated in FIGS. 8A, 8B, 9A, and 9B. The keyboard/mouse 308 is an example of an input device. The input device specifies the utility pole 105 and the like in the area-of-interest cropping unit 301.

The processing flow of the aerial line extraction system according to the first embodiment will be described with reference to FIG. 4. The aerial line extraction system is realized by allowing a general information processing apparatus to process software.

Figure 1:
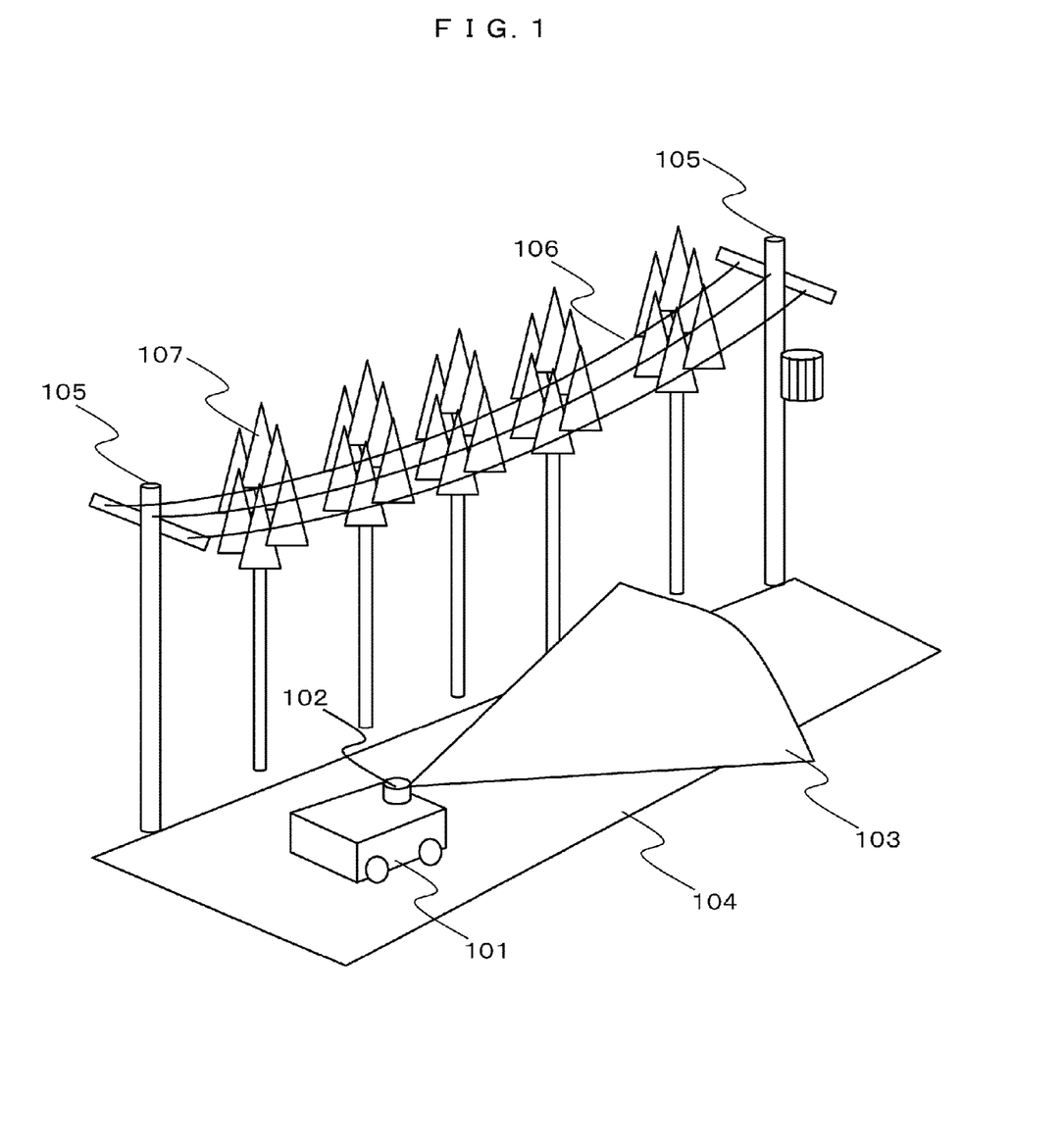
FIG. 1 is a perspective view illustrating an example in which a three-dimensional point cloud data is acquired by a laser distance measuring device.
Figure 2:
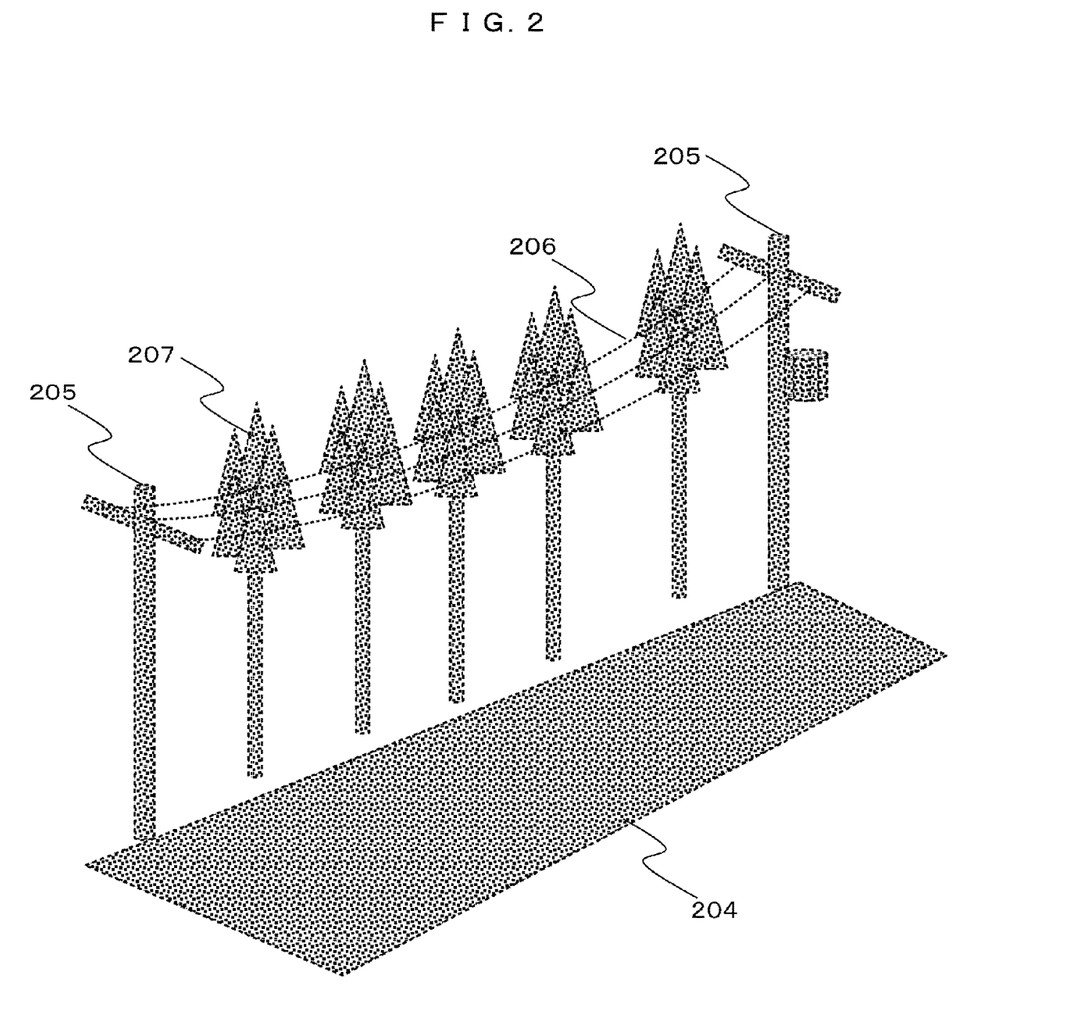
FIG. 2 is a conceptual diagram illustrating the three-dimensional point cloud data acquired by the laser distance measuring device.

In step S401, the three-dimensional point cloud data acquired by the method described in FIG. 1 is input from the three-dimensional point cloud data file 304. The three-dimensional point cloud data is a data of a point cloud as illustrated in FIG. 2. For example, in a case where a perpendicular coordinate system is employed, each point is represented by coordinates (x, y, z). The origin (0, 0, 0) of the coordinates and the x-axis, y-axis, and z-axis can be set arbitrarily, but in general, the (x, y) coordinates are defined in a form that can be associated with a map, and in many cases, the z-axis is taken to be in the vertical direction. Herein, the coordinate system of the input three-dimensional point cloud data is referred to as a world coordinate system, and the coordinate system that is subjected to coordinate conversion for easy processing is referred to as a local coordinate system. In addition, a spherical coordinate system or another coordinate system may be used instead of the perpendicular coordinate system.

Figure 5A:
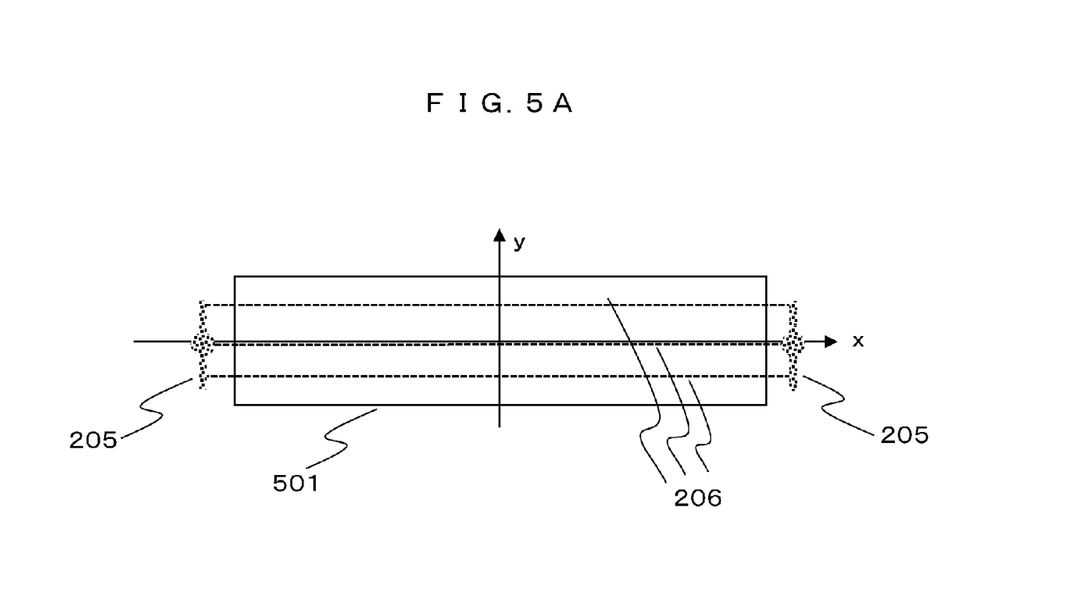
FIG. 5A is a diagram illustrating a setting example of an area of interest and a local coordinate system and is a schematic diagram of the three-dimensional point cloud data of FIG. 2 viewed from the above.
Figure 5B:
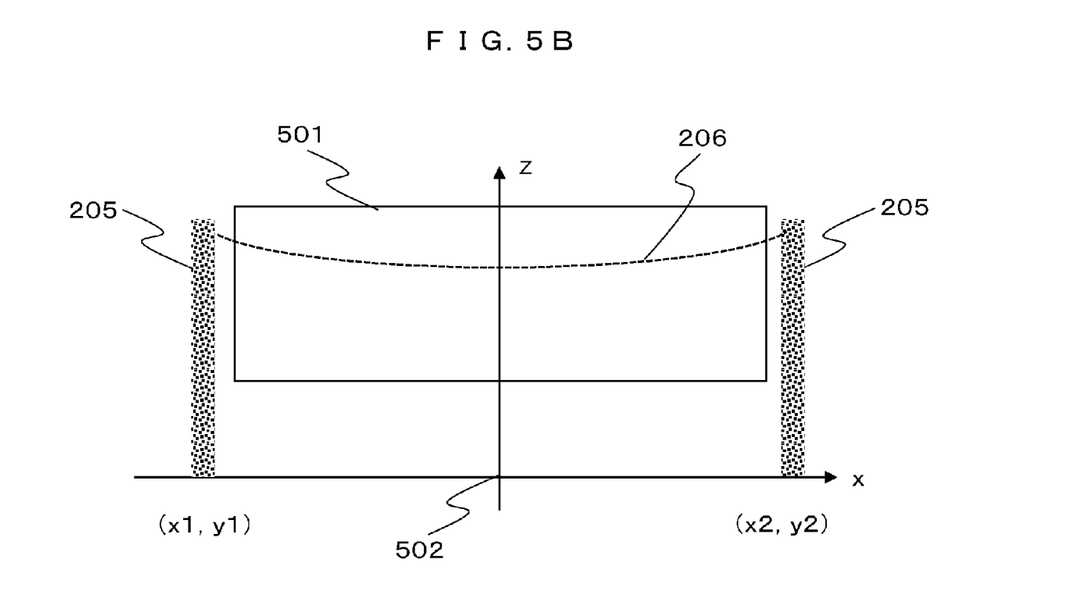
FIG. 5B is a diagram illustrating a setting example of an area of interest and a local coordinate system, and is a schematic diagram of the three-dimensional point cloud data of FIG. 2 viewed from the side.

In step S402, the area-of-interest cropping unit 301 crops a portion where the point cloud 206 of the aerial line is likely to exist as an area of interest from the three-dimensional point cloud data. The cropping method is not particularly limited, but for example, as illustrated in FIGS. 5A and 5B, the area of interest 501 is defined and cropped on the basis of the coordinates of two utility poles.

The area-of-interest cropping unit 301 obtains the coordinates that define the area of interest 501 by setting the utility pole coordinates and the like as a reference. After that, the area-of-interest cropping unit 301 extracts the point cloud in the area of interest 501 from the three-dimensional point cloud data stored in the three-dimensional point cloud data file 304.

The concept of the extraction processing of the area of interest in step S402 will be described with reference to FIGS. 5A and 5B. Herein, FIG. 5A is a schematic view of the three-dimensional point cloud data of FIG. 2 viewed from the above, and FIG. 5B is a schematic view of the three-dimensional point cloud data of FIG. 2 viewed from the side. For the explanation, a local coordinate system is employed, and the longitudinal direction (extension direction) of the point cloud 206 of the aerial line is set as x, the height direction (direction perpendicular to the ground) is set as z, and the direction perpendicular to x and z is set as y.

As the area of interest 501, for example, a rectangular parallelepiped region parallel to a line connecting a pair of utility pole coordinates $(x_1, y_1)$ and $(x_2, y_2)$ is set. In the local coordinate system 502, for example, the midpoint between a pair of utility pole coordinates is set as the origin, the direction connecting the pair of utility pole coordinates is set as the x-axis, the direction parallel to the ground and perpendicular to the x-axis is set as the y axis, and the direction perpendicular to the ground is set as the z-axis.

As a method of designating a pair of utility pole coordinates $(x_1, y_1)$ and $(x_2, y_2)$, for example, there is a method in which a user selects two utility poles 105 by using the keyboard/mouse 308 on a screen of the display 307 displaying a data list of the utility poles 105 searched from the facility DB 305. Alternatively, there is a method in which a user selects two utility poles 105 by using the keyboard/ mouse 308 on the screen of the display 307 displaying the installation position of the utility poles 105 on a map. Furthermore, there is a method of selecting a combination of two neighboring utility poles 105 from the coordinate information of the utility pole 105 registered in the facility DB 305 in an indiscriminative manner.

As illustrated in FIGS. 5A and 5B, in the area of interest 501 defined by the pair of utility pole coordinates, point clouds such as the point cloud 204 of roads and the point cloud 205 of utility poles are highly likely to be removed as outside of the area of interest 501, and the point cloud 206 of aerial lines or the point cloud 207 of trees are highly likely to remain as inside of the area of interest 501.

In step S403, after cropping the area of interest 501, the world coordinate system is converted to the local coordinate system in which two utility poles 105 are on the x-axis, and the centers of the two utility poles 105 become origins (x, y)=(0, 0).

In addition, the area-of-interest extraction in step S402 and the conversion to the local coordinate system in step S403 are not limited to this order, and the order of processing may be changed.

In step S404, the aerial line candidate extraction unit 302 performs the extraction of the point cloud of aerial line candidates. The aerial line candidate extraction unit 302 extracts a candidate point cloud data of the aerial line 106 from the three-dimensional point cloud data in the area of interest 501.

In step S405, estimation of the aerial line model is performed. The aerial line model estimation unit 303 estimates the model of the aerial line 106 on the basis of the extracted candidate point cloud data of the aerial line 106. In step S406, conversion to the world coordinate system is performed. In step S406, in a case where the local coordinate system has been converted in step S403, the coordinate system is returned to the world coordinate system. In step S407, the outputting of the aerial line model is performed. Specifically, the model of the aerial line 106 estimated by the aerial line model estimation unit 303 is output to the aerial line model file 306. In addition, if necessary, the aerial line model of the estimation result is superimposed and displayed on the display 307 which displays the point cloud or the like of the aerial line candidates.

Figure 6:
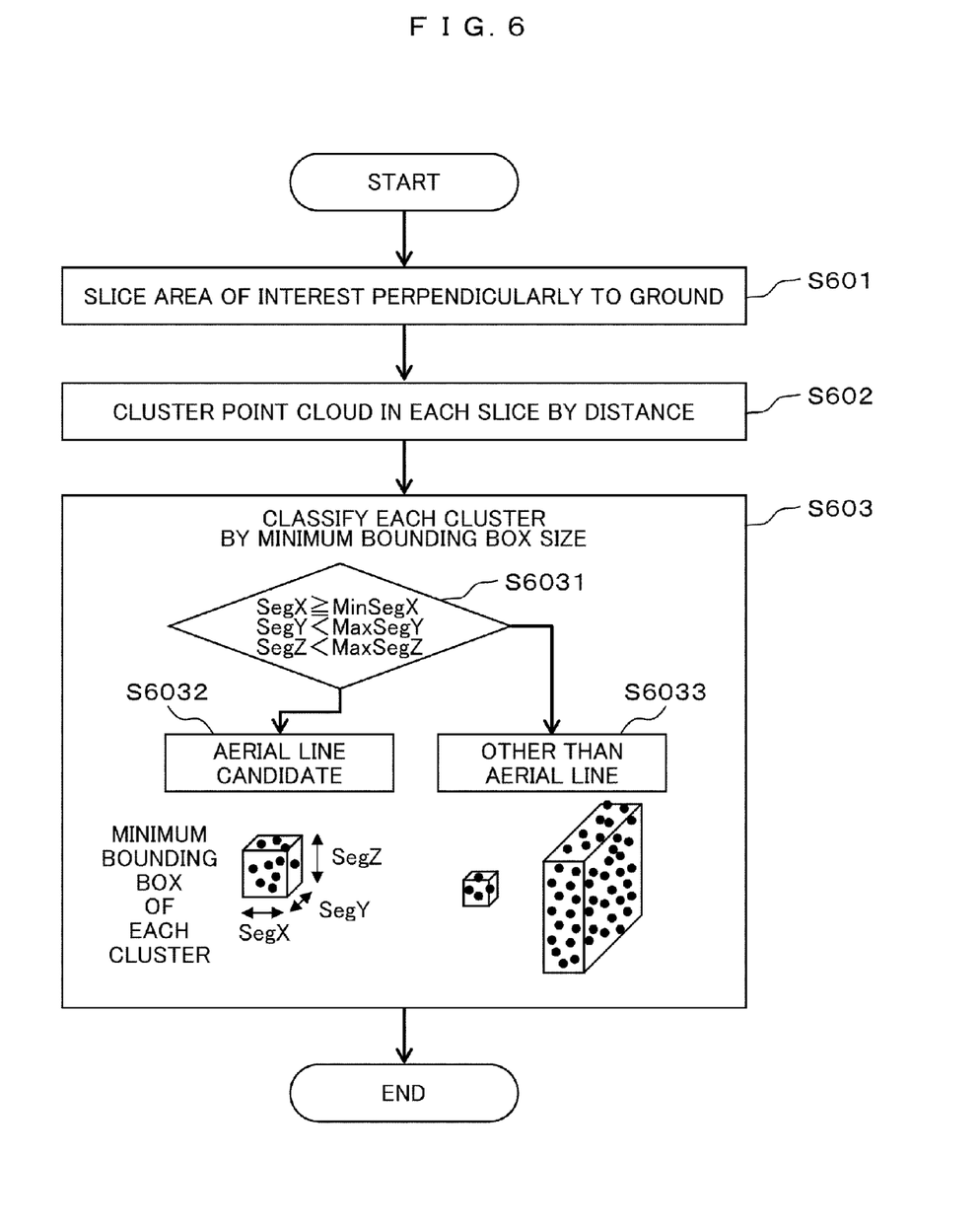
FIG. 6 is a flowchart illustrating a processing flow of aerial line candidate point cloud extraction.

With reference to FIG. 6, the processing flow of the he aerial line candidate point cloud extraction in step S404 of FIG. 4 will be described.

In step S601, the area of interest 501 is sliced perpendicularly to the ground.

Figure 7A:
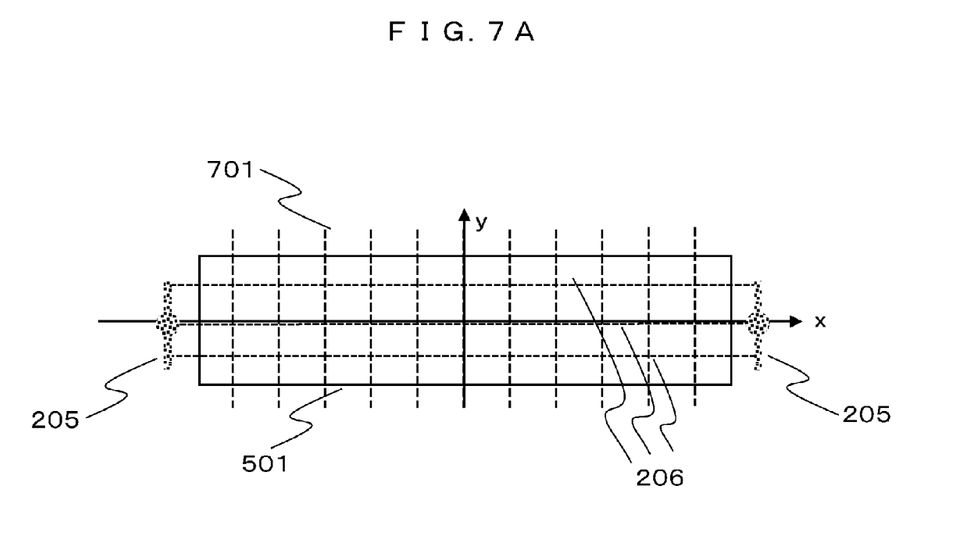
FIG. 7A is a diagram describing an example of slicing an area of interest perpendicularly to the ground.
Figure 7B:
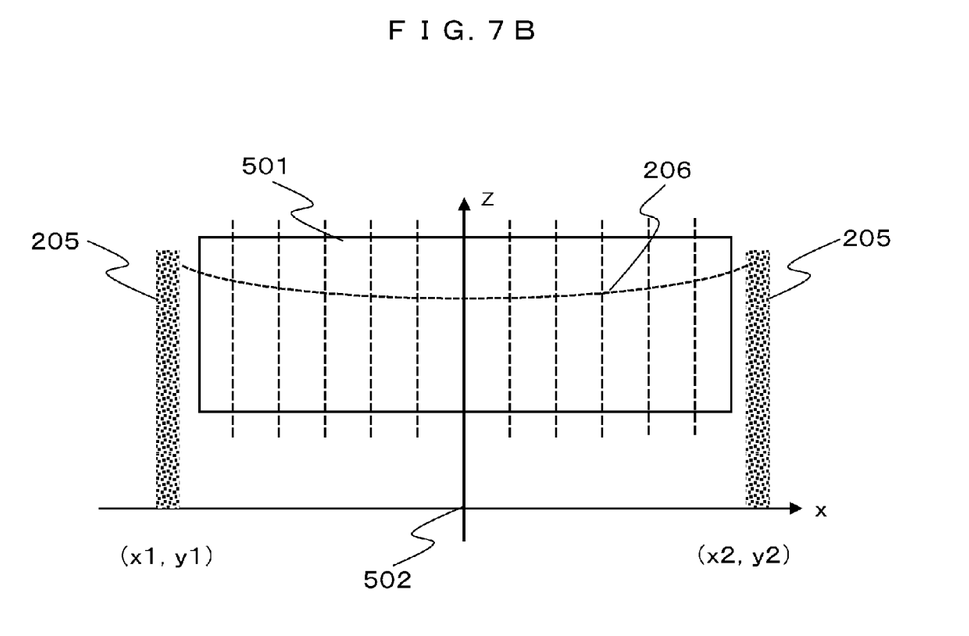
FIG. 7B is a diagram describing an example of slicing an area of interest perpendicularly to the ground.

An example of slicing the area of interest 501 perpendicularly to the ground will be described with reference to FIGS. 7A and 7B.

In step S601, the area of interest 501 cropped from the three-dimensional point cloud data as a region where the point cloud 206 of the aerial lines is likely to exist is sliced by the slice planes 701 that are perpendicular to the ground and perpendicular to a line connecting the point clouds 205 of a pair of utility poles. In this manner, the three-dimensional point cloud data in the area of interest 501 is segmented by the slice planes 701 at regular intervals. That is, the three-dimensional point cloud data in the area of interest 501 is segmented by the slice planes 701 that are perpendicular to the ground and perpendicular to the line connecting the point clouds 205 of the pair of utility poles. The rectangular parallelepiped regions (simply, referred to as slices) segmented by the slice planes 701 usually have the same shape and the same volume.

In step S602, each slice is subjected to clustering by distance.

The clustering is based on a general clustering method. For example, the maximum value of the distance determined to be the same cluster is set as a threshold value parameter, and in a case where the distance to the nearest point is equal to or less than the threshold value, the cluster is determined to be the same cluster.

In step S603, each cluster is classified by the minimum bounding box size (step S6031). Specifically, it is determined whether or not the following mathematical Formula 1 is satisfied. In mathematical Formula 1, SegX, SegY, and SegZ represent minimum bounding box sizes. SegX represents a difference between the maximum X coordinate and the minimum X coordinate of the point group in the cluster, SegY represents a difference between the maximum Y coordinate and the minimum Y coordinate, and SegZ represents a difference between the maximum Z coordinate and the minimum Z coordinate. MinSegX, MaxSegY, and MaxSegZ are threshold value parameters set in the aerial line extraction system.

$$SegX \geq MinSegX, SegY < MaxSegY,$$
$$SegZ < MaxSegZ \qquad \text{[mathematical Formula 1]}$$

In a case where the result of the determination is that the above-described mathematical Formula 1 is satisfied, the point cloud is set as a candidate for the point cloud 206 of aerial lines (step S6032). In a case where the result of the determination is that the above-described mathematical Formula 1 is not satisfied, the point group is determined as a point cloud candidate other than the candidate of the point cloud 206 of aerial lines (step S6033).

Figure 4:
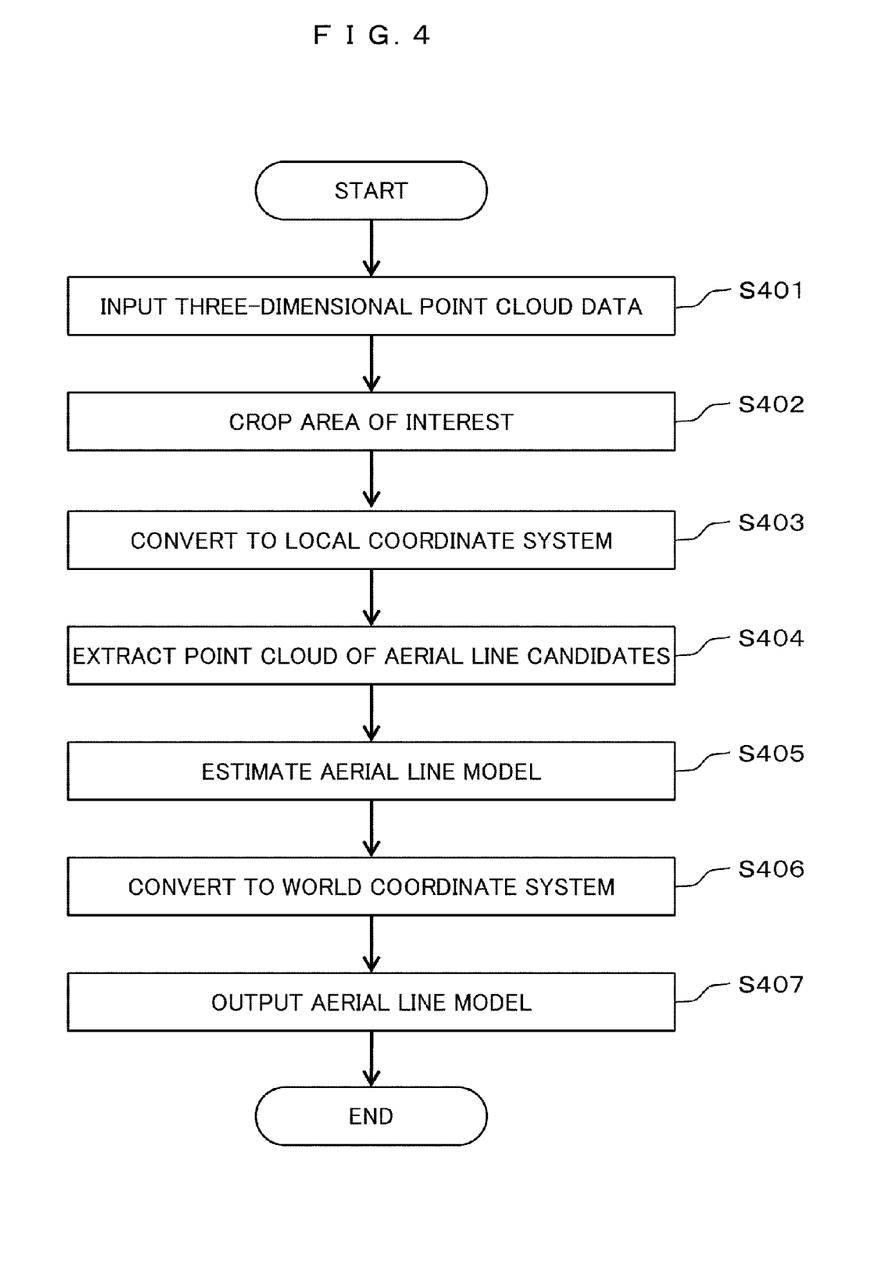
FIG. 4 is a flowchart illustrating a processing flow of the aerial line extraction system according to the first embodiment.

As described above, in the processing of the aerial line candidate point cloud extraction in step S404 of FIG. 4, the aerial line candidate extraction unit 302 segments the three-dimensional point cloud data in the area of interest 501 by the slice planes 701 at regular intervals, and the areas segmented by the slice planes 701 are clustered to generate a plurality of clusters. Then, the plurality of clusters are classified by a predetermined size, and thus, the candidate point cloud data of the aerial line 106 is extracted.

Specifically, the aerial line candidate extraction unit 302 segments the three-dimensional point cloud data in the area of interest 501 by the slice plane 701 that is perpendicular to the ground and perpendicular to a line connecting the point clouds 205 of the pair of utility poles and generates a plurality of clusters by clustering the rectangular parallelepiped regions segmented by the slice plane 701 according to the distance. Then, the plurality of clusters are classified with the minimum bounding box size, and thus, the candidate point cloud data of the aerial line 106 is extracted.

In addition, the aerial line candidate extraction unit 302 determines whether or not the minimum bounding box size falls within a predetermined dimensional range (dimensional range defined by the above-described mathematical Formula 1). In a case where the result of the determination is that the minimum bounding box size falls within the predetermined dimensional range (in a case where the above-described mathematical Formula 1 is satisfied), the point cloud data is determined to be a candidate point cloud data of the aerial line 106. In a case where the result of the determination is that the minimum bounding box size does not fall within the predetermined dimensional range (in a case where the above-described mathematical Formula 1 is not satisfied), the point cloud data is determined to be a point cloud data other than the candidate point cloud data of the aerial line 106. For example, in a case where the result of the determination is that the minimum bounding box size does not fall within the predetermined dimensional range (in a case where the above-described mathematical Formula 1 is not satisfied), the point cloud data other than the candidate point cloud data of the aerial line 106 is determined as the point cloud data of the tree 107, and thus, the point cloud data of the tree 107 is removed as noise from the three-dimensional point cloud data in the area of interest 501.

In this manner, in the above-described aerial line candidate point cloud extraction processing, by performing the slicing processing (step S601) and the clustering processing (step S602) illustrated in FIG. 6, the point cloud 207 of the trees and the point cloud 206 of the aerial lines can be separated highly accurately.

Figure 8A:
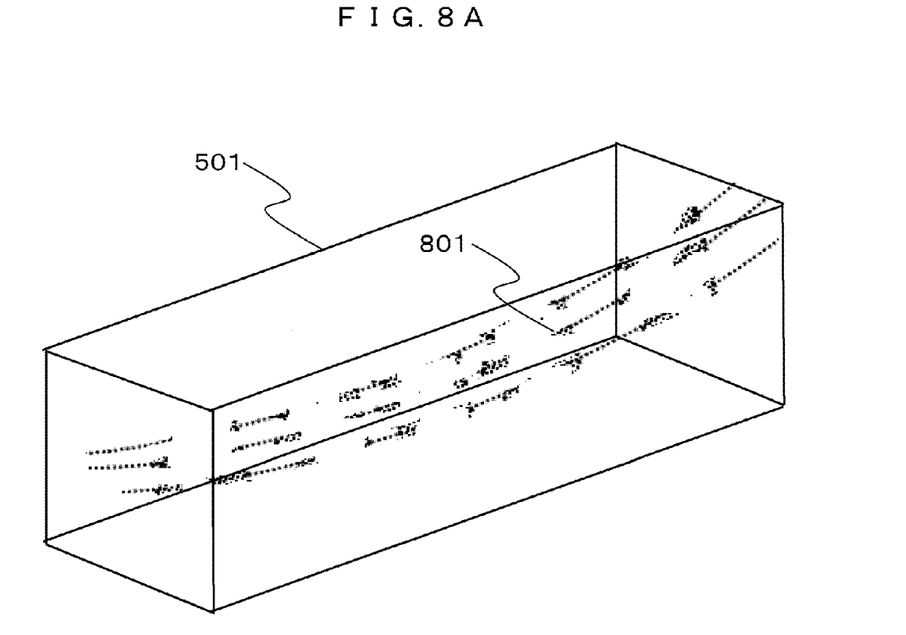
FIG. 8A is a diagram illustrating an example of an effect based on the first embodiment and illustrates a point cloud as a result of aerial line candidate extraction by slice segmentation.
Figure 8B:
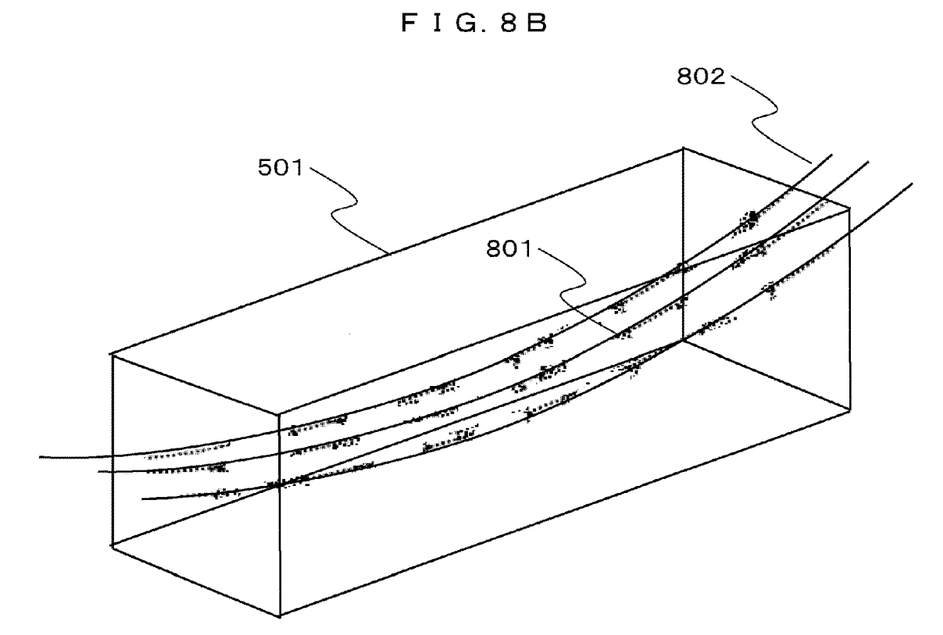
FIG. 8B is a diagram illustrating an example of an effect based on the first embodiment and illustrates a result of aerial line model estimation.

FIGS. 8A and 8B are conceptual diagrams illustrating an example of the effect based on the first embodiment, FIG. 8A illustrates a point cloud of aerial line candidate extraction results by slice segmentation, and FIG. 8B illustrates a result of aerial line model estimation.

In FIG. 8A, 8B indicates a point cloud of aerial line candidates in the area of interest 501. The extraction of the point cloud 801 of aerial line candidates in the area of interest 501 is performed by the aerial line candidate extraction unit 302 in FIG. 3 through step S404 in FIG. 4. As illustrated in FIG. 8A, the point cloud 801 of aerial line candidates is extracted in the area of interest 501, and noise of the point cloud 207 of trees or the like is removed.

In FIG. 8B, 802 indicates the result of the aerial line model estimation estimated on the basis of the point cloud 801 of aerial line candidates in the area of interest 501. The aerial line model estimation is performed by the aerial line model estimation unit 303 in FIG. 3 through step S405 in FIG. 4. As illustrated in FIG. 8B, the aerial line model 802 corresponding to the point cloud 801 of aerial line candidates is estimated.

Figure 9A:
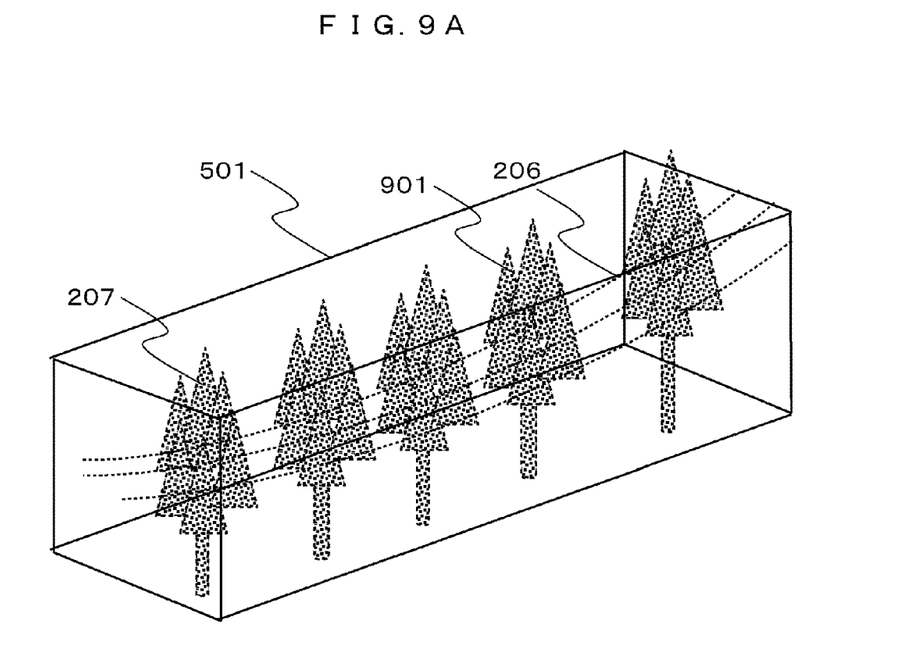
FIG. 9A is a diagram illustrating a result of a case where first embodiment is not applied and illustrates a point cloud in which an area of interest is cropped.
Figure 9B:
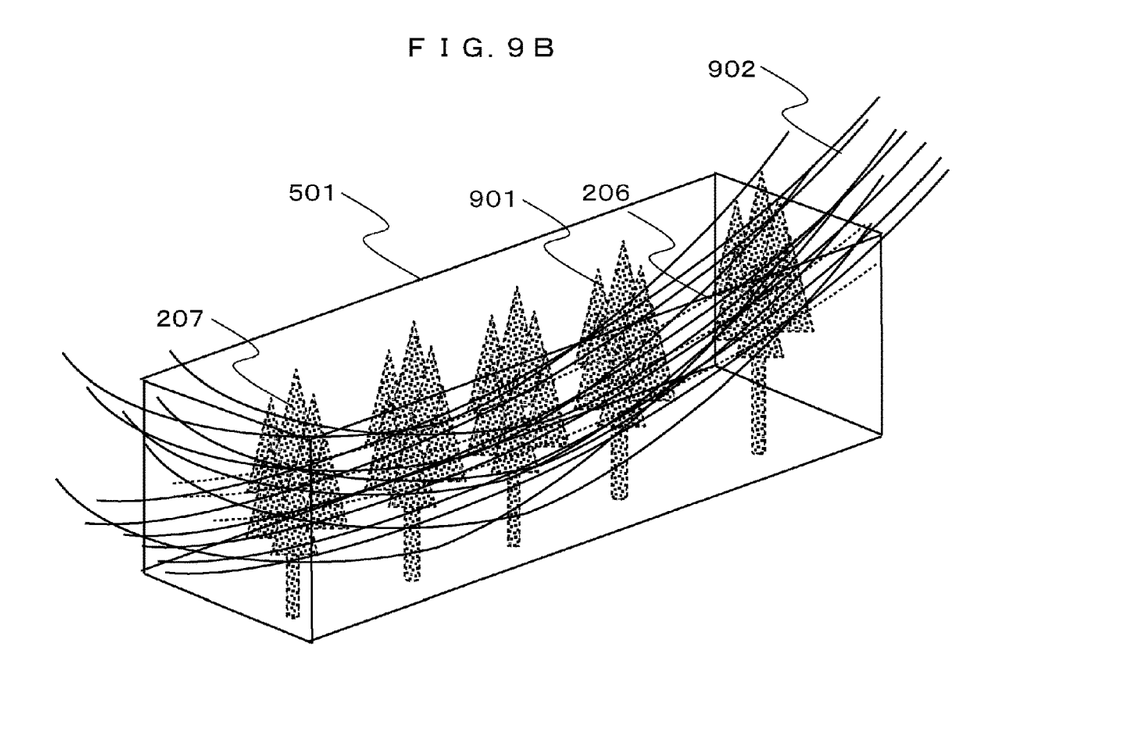
FIG. 9B is a diagram illustrating a result of a case where first embodiment is not applied and illustrates a result of aerial line model estimation.

FIGS. 9A and 9B are conceptual diagrams illustrating results of a case where the first embodiment is not applied, FIG. 9A illustrates a point cloud in which the area of interest is cropped, and FIG. 9B illustrates a result of the aerial line model estimation.

As illustrated in FIG. 9A, in a point cloud 901 of the area of interest 501, a point cloud 207 of trees and a point cloud 206 of aerial lines are mixed.

As a result, in a result 902 of the aerial line model estimation illustrated in FIG. 9B, the point cloud 207 of trees and the point cloud 206 of aerial lines are not separated, and both the point cloud 207 of trees and the point cloud 206 of aerial lines become aerial line candidates. For this reason, an infinite number of aerial line models 902 are estimated. This is because the extraction of the point cloud 801 of aerial line candidates in the area of interest 501 is not performed by the aerial line candidate extraction unit 302 in FIG. 3 as in FIGS. 8A and 8B.

According to the first embodiment, the aerial line candidate extraction unit 302 removes the point cloud data of the trees 107 from the three-dimensional point cloud data in the area of interest 501 as noise, and thus, extracts the candidate point cloud data of the aerial lines 106. As a result, the point cloud 207 of trees and the point cloud 206 of aerial lines can be separated, and particularly, the aerial lines 106 can be extracted even in a case where the trees 107 become noise in a mountainous area.

Second Embodiment

In a second embodiment, an example of a lead-in line and a branch line as an example of an aerial line will be described. The lead-in line is a cable for wiring between the utility pole and each house and usually denotes a line from the utility pole to the lead-in-line attachment point attached to the eaves of each house. A branch line is a wire for supporting the utility pole. Most of the system configuration and the processing flow may be configured similarly to the first embodiment. Hereinafter, the portions different from those of the first embodiment will be described.

Figure 10:
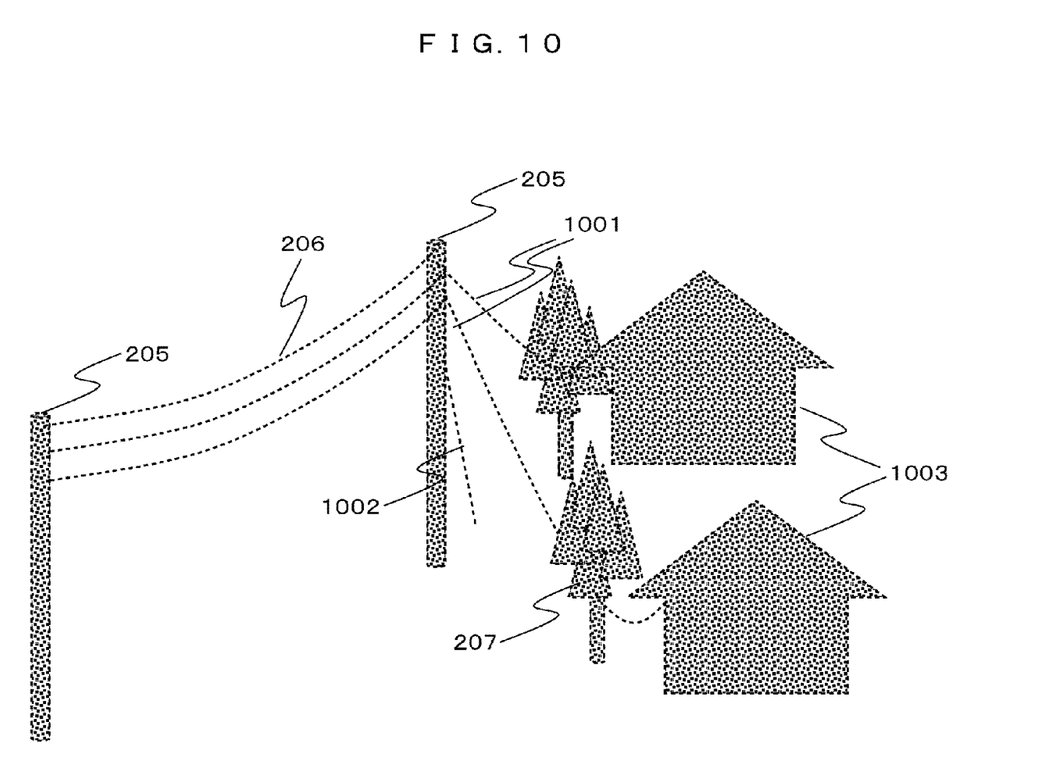
FIG. 10 is a conceptual diagram illustrating a display example of a three-dimensional point cloud data including a lead-in line according to a second embodiment.

FIG. 10 is a display example of the three-dimensional point cloud data including a lead-in line and a branch line.

Reference numeral 1001 indicates a point cloud of a lead-in line (connecting a utility pole and each house). Reference numeral 1002 indicates a point cloud of a branch line (installed to support the utility pole 205). Reference numeral 1003 indicates a point cloud of a building. The point cloud 1001 of the lead-in line from the utility pole 205 is connected to a lead-in-line attachment point of the point cloud 1003 of a building. In addition, point cloud data such as the point cloud 207 of trees is included. In the case of setting the point cloud 1001 of such lead-in lines as a target, the case can be dealt with by changing the an area-of-interest cropping processing step S402 in FIG. 4 and the an area of interest slicing processing step S601 in FIG. 6 in the processing according to the first embodiment illustrated in the flow of FIG. 4.

Figure 11:
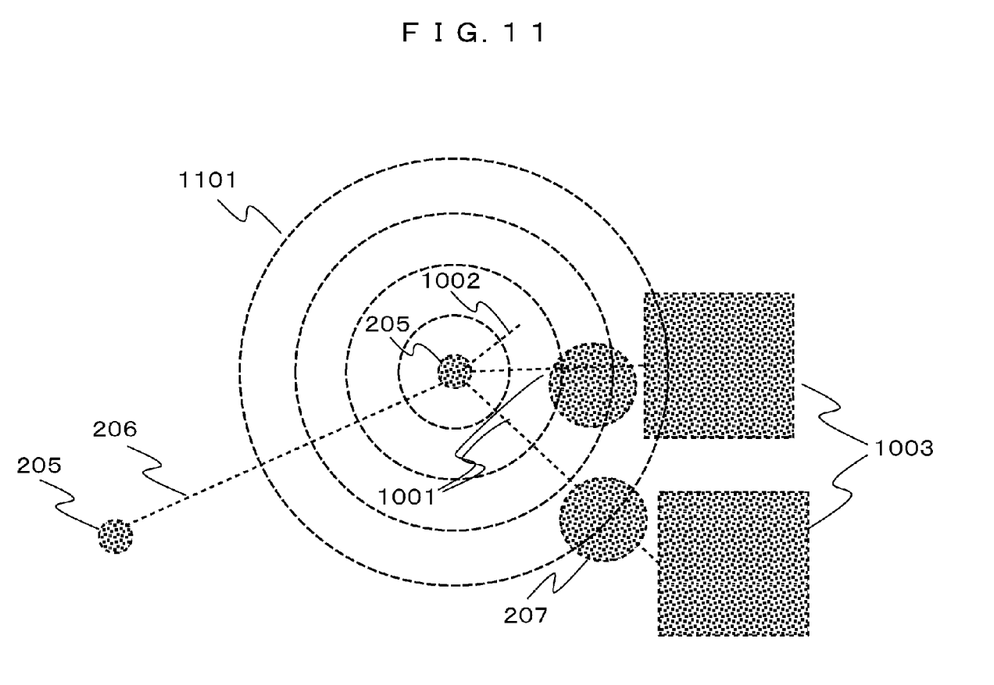
FIG. 11 is a conceptual diagram of a three-dimensional point cloud including the lead-in line according to the second embodiment as viewed down from the above.

FIG. 11 is a conceptual diagram of the three-dimensional point cloud including the point cloud 1001 of the lead-in line and the point cloud 1002 of branch line of FIG. 10. As illustrated in FIG. 11, the lead-in line and the branch line are lines extending radially from the utility pole as a base point.

The slice plane 1101 is a concentric cylinder centered on the point cloud 205 of the utility pole. The point cloud 1001 of lead-in lines is led from the point cloud 205 of utility poles to the point cloud 1003 of buildings. In the second embodiment, in the area-of-interest cropping processing (S402) illustrated in FIG. 4, a cylinder centered on the point cloud 205 of the utility poles is defined as the area of interest by designating the point cloud 205 of the utility poles.

In the area of interest slicing processing step S601 illustrated in FIG. 6, by slicing the area of interest by concentric cylinders, donut-shaped subdivided areas are obtained. Specifically, the area of interest is segmented by cylinder planes of concentric circles that are perpendicular to the ground and are equally spaced in the radial direction with the utility pole as the central axis. The other processing is almost the same as that according to the first embodiment, and the description thereof is omitted.

According to the second embodiment, the aerial line can be extracted even in a case where the lead-in line or the branch line is included.

What is claimed is:

1. An aerial line extraction system comprising:
a memory;
an input/output device; and
a processor communicatively coupled to the memory and the input/output device, wherein the processor is configured to:
crop a region where a point cloud data of aerial lines is assumed to exist as an area of interest by setting coordinates of utility poles as a reference from a three-dimensional point cloud data of a three-dimensional shape that includes the aerial lines and trees installed in the air via the utility poles,
extract a candidate point cloud data of the aerial lines from the three-dimensional point cloud data in the area of interest,
estimate a model of the aerial lines on the basis of the extracted candidate point cloud data of the aerial lines,
segment the three-dimensional point cloud data in the area of interest by slice planes at regular intervals,
generate a plurality of clusters by clustering regions segmented by the slice planes by distance as the region segmented by the slice plane,
set a threshold value a maximum distance determined,
generate the plurality of clusters using the threshold value, such that on a condition that a point of the point cloud data is at a distance that is less than or equal to the threshold value, the point is set within a same cluster, and on a condition that the point is at a distance that is greater than the threshold value, the point is set within an other cluster, and
extract the candidate point cloud data of the aerial lines by classifying the plurality of clusters by a predetermined size.

2. The aerial line extraction system according to claim 1, wherein the processor
segments the three-dimensional point cloud data in the area of interest by the slice plane perpendicular to the ground and perpendicular to a line connecting between the pair of utility poles,
generates the plurality of clusters by clustering a rectangular parallelepiped region, and
extracts the candidate point cloud data of the aerial line by classifying the plurality of clusters as the predetermined size by a minimum bounding box size.

3. The aerial line extraction system according to claim 2, wherein the processor
determines whether or not the circumscribed rectangle size falls within a predetermined dimensional range,
in a case where the minimum bounding box size falls within the predetermined dimensional range as a result of the determination, determines the point cloud data to be the candidate point cloud data of the aerial line, and
in a case where the minimum bounding box size does not fall within the predetermined dimensional range as a result of the determination, determines the point cloud data to be a point cloud data other than the candidate point cloud data for the aerial line.

4. The aerial line extraction system according to claim 3, wherein, in a case where the minimum bounding box size does not fall within the predetermined dimensional range as the result of the determination, the processor determines the point cloud data other than the candidate point cloud data for the aerial line to be the point cloud data of the tree and removes the point cloud data of the tree as noise from the three-dimensional point cloud data in the area of interest.

5. The aerial line extraction system according to claim 1, further comprising a display device that displays the model of the aerial line estimated by the processor.

6. The aerial line extraction system according to claim 3, wherein the predetermined dimensional range is defined by:

$$SegX \geq MinSegX, SegY < MaxSegY, SegZ < MaxSegZ,$$

wherein SegX is a difference between a maximum X coordinate and a minimum X coordinate, MinSegX is the threshold value in the X axis, SegY is a difference between a maximum Y coordinate and a minimum Y coordinate, MaxSegY is the threshold value in the Y axis, SegZ is a difference between a maximum Z coordinate and a minimum Z coordinate, and MaxSegZ is the threshold value in the Z axis.

7. An aerial line extraction system, comprising:
a memory;
an input/output device; and
a processor communicatively coupled to the memory and the input/output device, wherein the processor is configured to:
crop a region where a point cloud data of an aerial line is assumed to exist as an area of interest by setting coordinates of a utility pole as a reference from a three-dimensional point cloud data of a three-dimensional shape that includes the aerial line and the tree installed in the air via a utility pole,
extract a candidate point cloud data of the aerial line from the three-dimensional point cloud data in the area of interest,
estimate a model of the aerial line on the basis of the extracted candidate point cloud data of the aerial line,
extract the candidate point cloud data of the aerial line by removing the point cloud data of the tree as noise from the three-dimensional point cloud data in the area of interest by
segmenting the three-dimensional point cloud data in the area of interest by slice planes at regular intervals,
generating a plurality of clusters by clustering regions segmented by the slice planes by distance as the region segmented by the slice plane, and
setting a threshold value a maximum distance determined,
generating the plurality of clusters using the threshold value, such that on a condition that a point of the point cloud data is at a distance that is less than or equal to the threshold value, the point is set within a same cluster, and on a condition that the point is at a distance that is greater than the threshold value, the point is set within an other cluster.

8. An aerial line extracting method comprising:
a three-dimensional point cloud data acquiring step of acquiring a three-dimensional point cloud data of a three-dimensional shape including aerial lines and trees installed in the air via utility poles;
an area-of-interest cropping step of cropping a region where a point cloud data of the aerial lines is assumed to exist as an area of interest by setting coordinates of the utility poles as a reference from a three-dimensional point cloud data;
an aerial line candidate extracting step of extracting a candidate point cloud data of the aerial lines from the three-dimensional point cloud data in the area of interest; and
an aerial line model estimating step of estimating a model of the aerial lines on the basis of the extracted candidate point cloud data of the aerial lines,
wherein the aerial line candidate extracting step
segments the three-dimensional point cloud data in the area of interest by slice planes at regular intervals;
generates a plurality of clusters by clustering regions segmented by the slice planes by distance as the region segmented by the slice plane,
sets a threshold value a maximum distance determined,
generates the plurality of clusters using the threshold value, such that on a condition that a point of the point cloud data is at a distance that is less than or equal to the threshold value, the point is set within a same cluster, and on a condition that the point is at a distance that is greater than the threshold value, the point is set within an other cluster, and
extracts the candidate point cloud data of the aerial lines by classifying the plurality of clusters by a predetermined size.

9. The aerial line extracting method according to claim 8, wherein the aerial line candidate extracting step
segments the three-dimensional point cloud data in the area of interest by the slice planes that are perpendicular to the ground and perpendicular to a line connecting between a pair of the utility poles,
generates a plurality of the clusters by clustering a rectangular parallelepiped region, and
extracts the candidate point cloud data of the aerial line by classifying a plurality of the clusters with a circumscribed rectangle size as the predetermined size.

10. The aerial line extracting method according to claim 9, wherein the aerial line candidate extracting step
determines whether or not the minimum bounding box size falls within a predetermined dimensional range,
in a case where the minimum bounding box size falls within the predetermined dimensional range as a result of the determination, determines the point cloud data to be the candidate point cloud data of the aerial line, and
in a case where the minimum bounding box size does not fall within the predetermined dimensional range as a result of the determination, determines the point cloud data to be a point cloud data other than the candidate point cloud data for the aerial line.

11. The aerial line extracting method according to claim 10, wherein, in a case where the minimum bounding box size does not fall within the predetermined dimensional range as the result of the determination, the aerial line candidate extracting step determines the point cloud data other than the candidate point cloud data for the aerial line to be the point cloud data of the tree and removes the point cloud data of the tree as noise from the three-dimensional point cloud data in the area of interest.

12. The aerial line extracting method according to claim 8, further comprising a display step of displaying a model of the aerial line estimated in the aerial line model estimating step.

* * * * *